US007461170B1

(12) United States Patent
Taylor et al.

(10) Patent No.: US 7,461,170 B1
(45) Date of Patent: Dec. 2, 2008

(54) ZONE-BASED RENDERING OF RESOURCE ADDRESSES

(75) Inventors: William David Taylor, Bellevue, WA (US); Dean S. Halstead, Redmond, WA (US); Andrew E. Datars, Duvall, WA (US); Alfredo Almada-Mireles, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 740 days.

(21) Appl. No.: 10/932,589

(22) Filed: Sep. 1, 2004

(51) Int. Cl.
*G06F 15/16* (2006.01)
(52) U.S. Cl. .................. 709/245; 709/203; 709/219; 709/223; 709/229; 709/246; 707/4; 707/10
(58) Field of Classification Search ............ 709/203, 709/217, 219, 245, 246, 223, 229; 718/105; 707/10, 3, 4
See application file for complete search history.

(56) References Cited

U.S. PATENT DOCUMENTS

| 6,457,060 | B1* | 9/2002 | Martin et al. ............... 709/245 |
| 6,691,281 | B1 | 2/2004 | Sorge et al. |
| 6,742,038 | B2 | 5/2004 | Britt, Jr. |
| 6,789,080 | B1* | 9/2004 | Sweet et al. ............... 707/10 |
| 7,089,489 | B1* | 8/2006 | Brok et al. ................ 715/207 |
| 2001/0049741 | A1* | 12/2001 | Skene et al. ............... 709/232 |
| 2001/0052016 | A1* | 12/2001 | Skene et al. ............... 709/226 |
| 2002/0046262 | A1* | 4/2002 | Heilig et al. .............. 709/219 |
| 2002/0073074 | A1* | 6/2002 | Sweet et al. ............... 707/2 |
| 2003/0149581 | A1* | 8/2003 | Chaudhri et al. ........... 705/1 |
| 2003/0225982 | A1* | 12/2003 | Fujita et al. .............. 711/148 |
| 2004/0083307 | A1* | 4/2004 | Uysal ..................... 709/246 |
| 2004/0249790 | A1* | 12/2004 | Komamura ................ 707/3 |
| 2005/0015475 | A1* | 1/2005 | Fujita et al. .............. 709/223 |
| 2005/0021862 | A1* | 1/2005 | Schroeder et al. .......... 709/246 |
| 2005/0071748 | A1* | 3/2005 | Shipp ..................... 715/501.1 |
| 2005/0138004 | A1* | 6/2005 | Teplitsky et al. ........... 707/3 |
| 2006/0020684 | A1* | 1/2006 | Mukherjee et al. ......... 709/219 |

OTHER PUBLICATIONS

Applicants' Statement of a Non-Public Use regarding features of a beta version of Microsoft Office distributed to a fixed number of users in or about Oct. 2002.

Fontana, J., "Microsoft Readies Portal Server," *NetworkWorldFusion*, Jan. 8, 2001, <http://www.nwfusion.com/news/2000/0108mstahoe.html> [retrieved Aug. 2, 2004].

Jianying, Y., et al., "An Application of Network Address Translation on Gateway," *IEEE Int. Conf. Neural Networks & Signal Processing*, Nanjing, China, Dec. 14-17, 2003, vol. 2, pp. 1658-1661.

Okazaki, N., et al., "An Efficient Method for Private Network Management Using IP Address Translation," *Trans. Inst. of Electr. Eng. Japan* 121-C(10):1562-9, Oct. 2001.

(Continued)

*Primary Examiner*—Oanh Duong
(74) *Attorney, Agent, or Firm*—Merchant & Gould (57) ABSTRACT

Resources may be published to one or more computer networks. However, linking and retrieval of these resources are prone to error because resource addresses may depend on the network that is used to access the resource. The present invention is generally directed to dynamically rendering links based on the location of the computer that generated a request. Dynamically rendering links allows resources to be published to multiple networks and referenced without resources appearing to be inaccessible to users.

24 Claims, 6 Drawing Sheets

OTHER PUBLICATIONS

Takahashi, Y., et al., "A Hard Handover Control Scheme Supporting IP Host Mobility," *Proceedings, Part I of the First International Conference on Networking, Lecture Notes in Computer Science 2093*, Colmar, France, Jul. 9-13, 2001, pp. 167-173.

Takahashi, Y., et al., "IP Host Mobility Support Using IP Address Translation," *IEIC Technical Report 100*(496):19-22, The Institute of Electronic, Information and Communication Engineers, Japan, Dec. 15, 2000.

* cited by examiner

| HOST COMPUTER IDENTIFIER | INTRANET ZONE (DEFAULT) | INTERNET ZONE |
|---|---|---|
| A22D928B-DCE0-4432-C21D-BDAEB326E1F | HTTP://CORP | HTTP://WWW.CORP.COM |
| B42C928A-BCE0-4432-B21D-BCAFC325E1F | HTTP://SUBCORP | HTTP://WWW.SUBCORP.COM |
| C32D928D-BBE0-4431-A22D-BCAEC325E1F | HTTP://SALES | HTTP://WWW.CORPSALES.COM |

*Fig. 4.*

| BASE URI | ZONE IDENTIFIER |
|---|---|
| HTTP://CORP | INTRANET ZONE |
| HTTP://WWW.CORP.COM | INTERNET ZONE |
| HTTP://SUBCORP | INTRANET ZONE |
| HTTP://WWW.SUBCORP.COM | INTERNET ZONE |
| HTTP://WWW.CORPSALES.COM | INTRANET ZONE |
| HTTP://SALES | INTERNET ZONE |

ZONE-BASED RENDERING OF RESOURCE ADDRESSES

FIELD OF THE INVENTION

The present invention relates to computer programs and, more specifically, to computer programs that improve dissemination of information to users over computer networks.

BACKGROUND OF THE INVENTION

Explosive growth in computer networks in the last two decades has changed the uses of computers dramatically. The largest computer network, commonly known as the Internet or World Wide Web ("WWW"), is now connecting millions of computers in the world, providing services like e-mail, file transfer, and hypermedia information retrieval across different computer platforms. With the rapid growth of computer networks, the management of these networks and their distributed applications has gained in importance.

Network architectures and services regularly change to handle the persistent growth and demands placed on networks. Several trends have been observed by network professionals and other industry observers. First, networks are increasingly decentralized. By distributing the management of a computer network among different systems, the network's flexibility and scalability are improved. Second, networks have greater utility when intelligent data analysis tools are provided to assist users in finding relevant information. Manual analysis of information stored on network-accessible computers has become impractical or even impossible, given the amount of information that is available. By employing intelligent data analysis tools, relevant information may be extracted from large sets of seemingly unstructured information systems.

Typically, documents and other resources are identified on a network using a Universal Resource Identifier ("URI") (sometimes referred to as a "resource address"). A URI consists of three segments of information, including (1) the protocol used to access a resource, (2) the identity of the computer that hosts the resource, and (3) the path or location of the resource on the host computer. Consider the following URI—"http://www.corp.com/sales/index.htm." This URI provides the three segments of information described above and may be read as follows—There is a resource available using the HyperText Transfer Protocol ("HTTP") that is hosted by the computer or cluster of computers identified as "www.corp-.com" that is accessible using the path "/sales/index.htm." The format of a URI is "standardized" by the Internet Engineering Task Force ("IETF"), which is an organization that has taken a leadership role in the operation of the Internet. The IETF defines the "standard" structure of a URI in Request for Comments #1738.

The same resources are increasingly being made available on more than one network. For example, the URI "http://www.corp.com/sales/index.htm" refers to a resource that is available to users of the Internet. However, a user of an Intranet (i.e., a private network inside a company or organization that uses the same protocols as the Internet) may reference the same resource as "http://corp/sales/index.htm." As known to those skilled in the art and others, a user will not be able to access a resource if the resource is incorrectly identified (i.e., a user connected to the Internet may not use a URI that is available only to users of an Intranet).

Even though computer network technology has improved, errors may occur because the network where resources will be accessed is not always known. For example, intelligent data analysis tools, such as search engines, assist users in identifying relevant resources and link users to those resources. When a search engine performs an analysis, the networks where resources will be accessed are not always known. As a result, a search engine may provide links that are not available from the network associated with the user. For example, the resource described above that is available from both an Intranet and the Internet may be identified by an Internet-based search engine. As a result, the Internet-based search engine may return a link (i.e., URI) that is not appropriate for a user of the Internet. For example, a link that references the URI "http://corp/sales/index.htm" may be returned in response to a user-generated query from an Internet-based search engine. However, users who activate the link will receive an error message that indicates the resource is not available.

In light of the above-identified problems, it would be beneficial to computer users to have a system that dynamically renders links (i.e., URIs) based on the network location of a computer where the request originated. The present invention is directed to providing such a system.

SUMMARY OF THE INVENTION

The present invention is generally directed to improving access to resources that are published to more than one network. Retrieval of resources that are published to more than one network has been problematic because the URIs used to identify resources are different for each network that a resource is accessible. One aspect of the present invention is a method that dynamically renders links based on the location where a request originated. More specifically, the method receives a request, such as a request for a link to a Web page, and determines the "network zone" where the request originated. Then a network-neutral identifier that identifies the computer or cluster of computers that hosts the requested resource is generated. When the network zone and the network-neutral identifier are known, the method renders a URI that is appropriate for the network zone where the request originated. Then existing systems may retrieve the requested resource for transmission to a user.

Another aspect of the present invention is an optimization technique for rendering URIs that are appropriate for the network zone where a request originated. In this aspect, URIs that reference requested resources are stored in a network-neutral format. When a request for a link to a resource is received, the computer that hosts the requested resource may be identified quickly. More specifically, the storage of URIs in a network-neutral format allows the computer that hosts the requested resource to be identified with fewer computations than a system where URIs are not stored in a network-neutral format.

Another aspect of the present invention is a portal server that includes a search engine, a resource publication module, a graphical user interface, and a link translation module. The portal server is configured to receive input from an administrator who identifies the network zones where resources are accessible. When a request is received, information obtained from the system administrator is used to identify the network zone where the request originated and render a URI that is appropriate for that network zone. After the URI is rendered, the resource may be retrieved and transmitted to the computer where the request originated.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is generally directed to improving access to resources by providing an efficient system for identifying resources that are published to more than one network. Links to resources are dynamically rendered when a request is received. More specifically, the network zone where a request originated and the computer or cluster of computers that hosts the requested resource are identified. Then a link that is appropriate for the network zone is rendered.

Although the present invention will primarily be described in the context of satisfying HTTP requests, those skilled in the relevant art and others will appreciate that the present invention is also applicable in other areas of computer networking and software engineering. The following description first provides an overview of a system in which the present invention may be implemented. Then a method that dynamically renders links based on the network zone where a request originated is described. The illustrative examples provided herein are not intended to be exhaustive or to limit the invention to the precise forms disclosed. Similarly, any steps described herein may be interchangeable with other steps, or combinations of steps, in order to achieve the same result.

Figure 1:
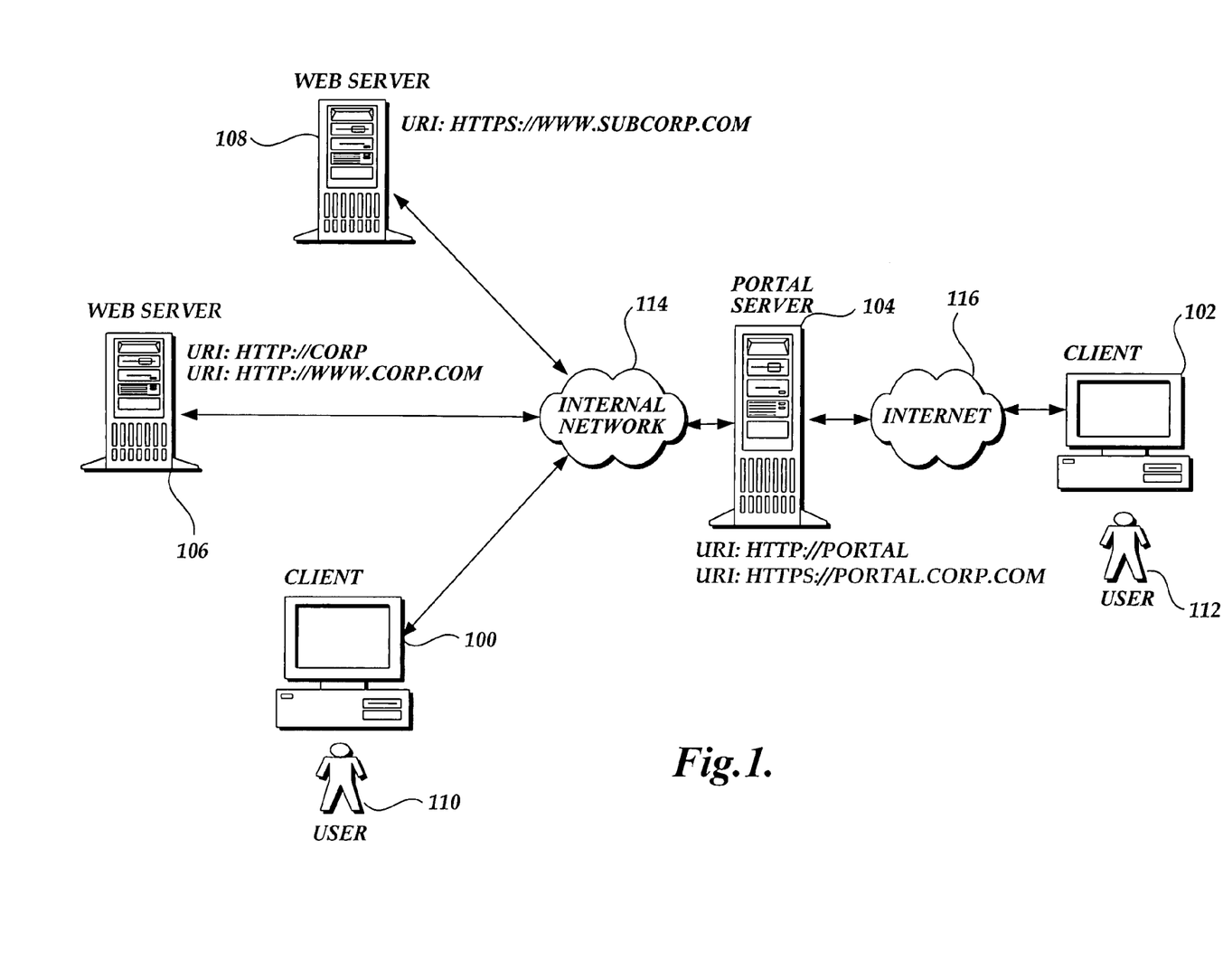
FIG. 1 is a pictorial depiction of an exemplary computer environment in which embodiments of the present invention may be implemented.

Referring to FIG. 1, the following is intended to provide an exemplary overview of one suitable computer environment in which the invention may be implemented. The illustrated environment comprises a plurality of client computers 100 and 102, a portal server 104, and Web servers 106 and 108. The client computers 100 and 102 are shown associated with users 110 and 112. The portal server 104 is communicatively connected with the Web servers 106 and 108 and the client computers 100 and 102. Also, the portal server 104 is configured to communicate with Web servers 106 and 108 and client computer 106 via an internal network 114 that may be implemented as a local area network ("LAN"), wide area network ("WAN") or even a direct communication link. Conversely, the portal server 104 is configured to communicate with client computer 102 over the Internet 116. As known to those skilled in the art and others, the computers illustrated in FIG. 1 may be configured to exchange documents, commands, and other types of data.

As illustrated in FIG. 1, the Web server 106 publishes a set of resources on a Web site that is accessible over the Internet 116 at the URI "http://www.corp.com." Also, the same Web site is accessible over an Intranet that utilizes the internal network 114 at the URI "http://corp." As further illustrated in FIG. 1, the Web server 108 publishes a set of resources on a Web site that is accessible over the Internet 116 at the URI "http://www.subcorp.com." However, the Web site hosted on server 108 is not accessible to the client computer 100 or any other computer that is only connected to the internal network 114. Also, the portal server 104 publishes a set of resources over the Internet 116 at the URI "http://portal.corp.com" and over the Intranet at the URI "http://portal." The computer environment illustrated in FIG. 1 hosts resources that are published to more than one network and may be accessed with different URIs, depending on the network zone of the client computer where a request originates. As described in further detail below, embodiments of the present invention are implemented on a portal server, such as portal server 104. However, as will be appreciated by those skilled in the art and others, the present invention may be implemented on any computer that accepts requests for resources. It should be well understood that the computer environment illustrated in FIG. 1 should be construed as exemplary and not limiting. For example, in some systems, resources available at a Web site may be hosted by a plurality of computers and not a single computer. For ease of illustration and because it is not important for an understanding of the present invention, this type of system is not illustrated in FIG. 1.

When software formed in accordance with the invention is implemented in one or more computers, such as portal server 104, the computers provide a way to dynamically render links that are appropriate for the network zone where a request originates. For example, in the context of FIG. 1, user 110 may send an e-mail to user 112 in the form of a markup document that contains one or more links to network-accessible resources. In this example, if user 110 sends a link with a URI that is appropriate for the Intranet, user 112 would normally receive an error message when the Intranet-appropriate link is activated. However, software formed in accordance with the present invention is able to translate links into a format that is appropriate for the user 112 who activated the link.

Figure 2:
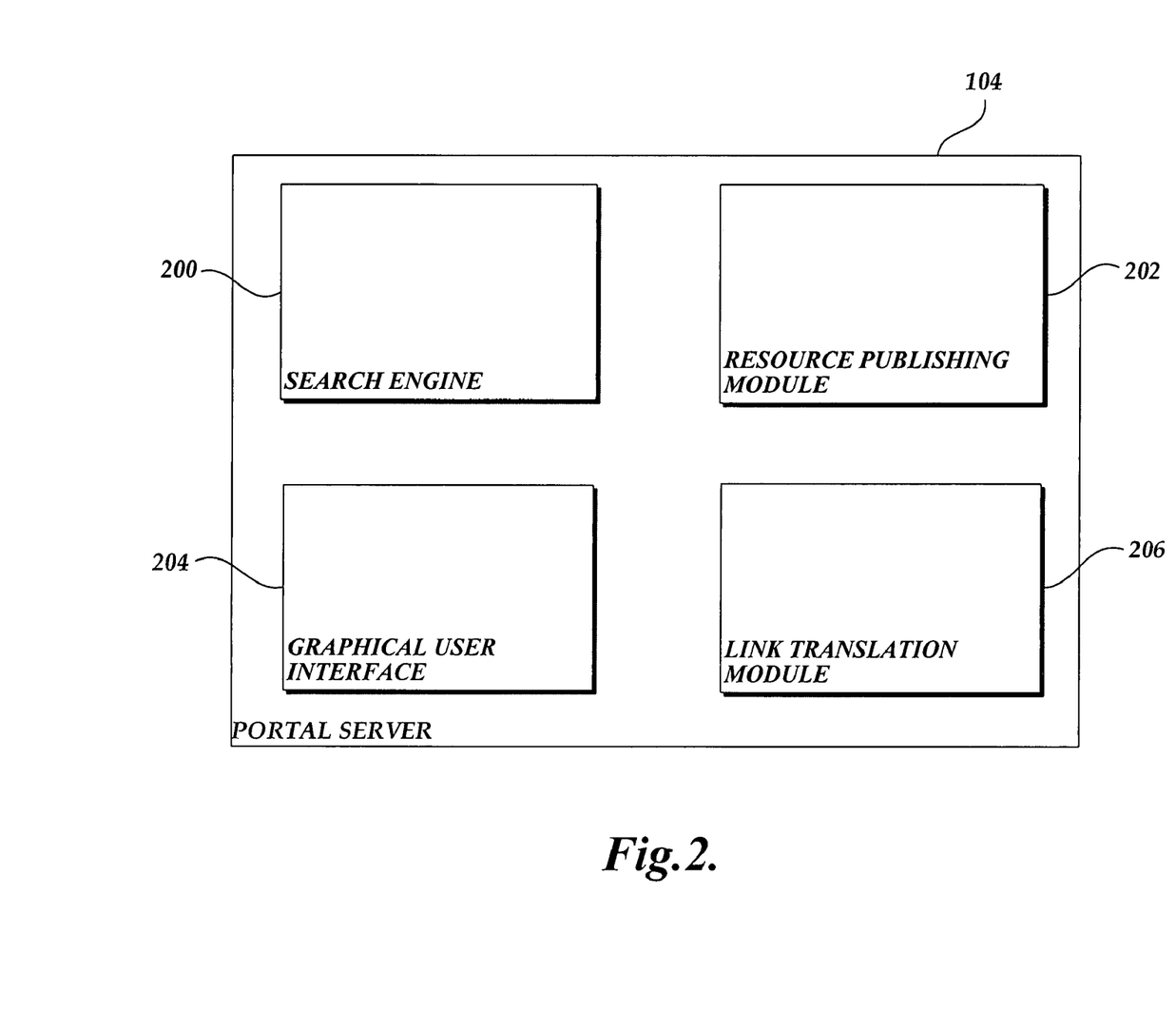
FIG. 2 is a block diagram of the portal server depicted in FIG. 1 that is suitable to illustrate embodiments of the present invention.

Now, with reference to FIG. 2, components of the portal server 104 illustrated in FIG. 1 will be described. In general, a portal server allows organizations to aggregate, organize, and search for resources hosted on multiple computers. Also, a portal server allows data to be shared with entities outside of an organization, such as customers and partners. As illustrated in FIG. 2 and described in further detail below, portal server 104 includes a search engine 200, resource publishing module 202, graphical user interface 204, and link translation module 206.

As known to those skilled in the art and others, a search engine is a program that searches resources for specified keywords and returns an index that contains links to resources where the keywords are found. More specifically, search engine 200 identifies resources related to an organization and creates an index of the most relevant resources in response to a user query.

The resource-publishing module 202 aggregates resources in a specified location and enforces a security system so that resources are only made available to authorized users. Also, the resource-publishing module 202 supports collaborative team efforts by profiling resources and establishing check-in and check-out procedures when more than one user accesses the same resource.

The graphical user interface 204 is operative to receive input and display information to a user or system administrator. For example, the portal server 104 includes a search engine 202 that receives queries and identifies relevant resources. The graphical user interface 204 obtains queries and displays the results to the user. Also, the graphical user interface 204 is operative to obtain input regarding the configuration of the portal server. For example, as described in further detail below, the portal server 104 supports mapping network zones to a set of resources. A system administrator may view and update this mapping information through the graphical user interface 204.

The portal server 104 also stores a link translation module 206 that receives a request, such as a request for a link to a Web page, and dynamically renders a URI that is appropriate for the network zone where the request originated. As a brief summary, the link translation module 108 consists of a set of software-implemented routines that identify a network zone where a request originated and the computer that hosts the requested resource. Then a URI is generated that is appropriate for the network zone where the request originated.

Figure 3:
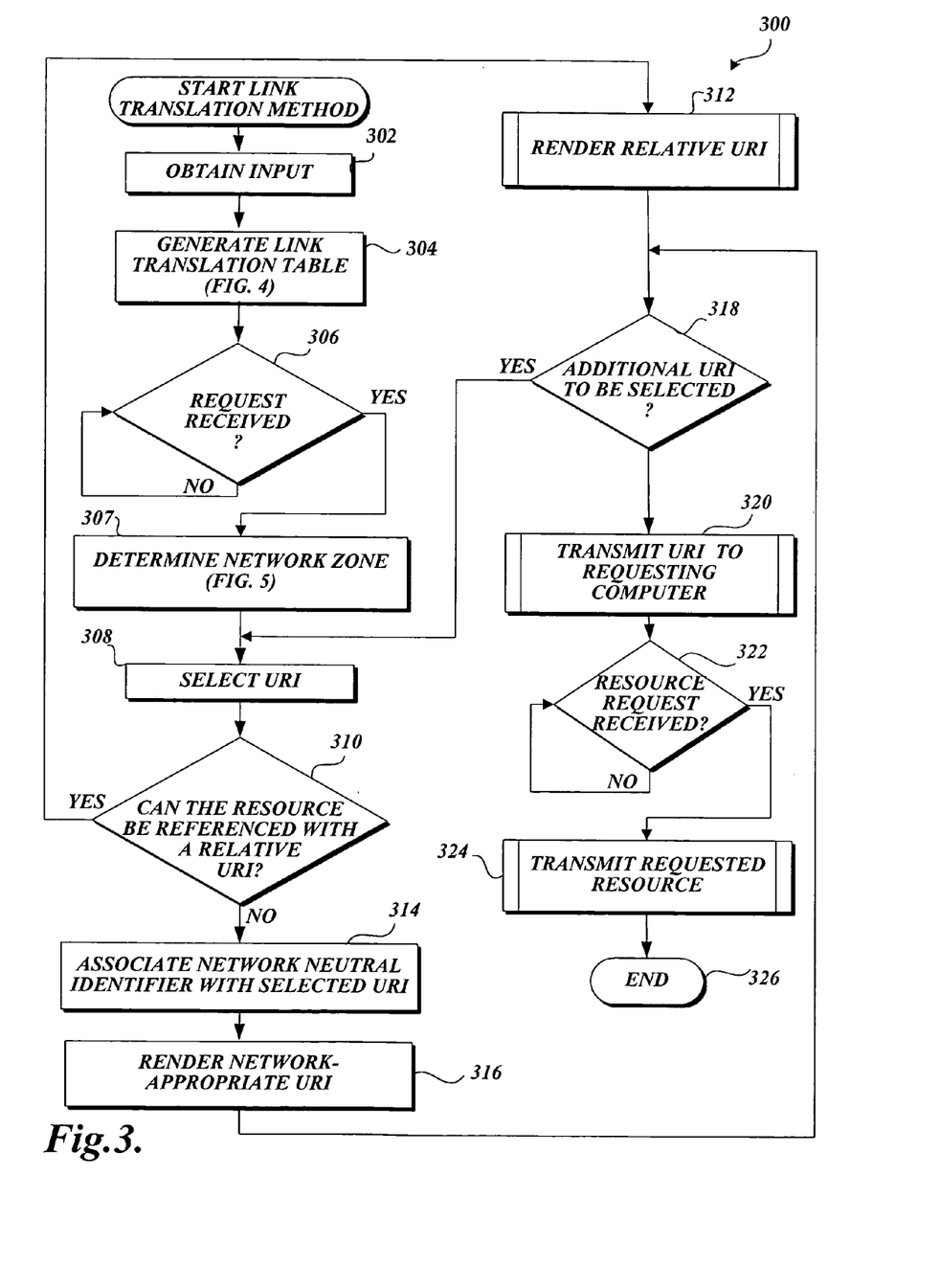
FIG. 3 is a flow diagram that illustrates a method that dynamically renders URIs based on the network zone where a request originated in accordance with one embodiment of the present invention.

FIG. 3 is a flow diagram illustrating one exemplary embodiment of a link translation method 300 formed in accordance with the present invention. In summary, the link translation method 300 receives a request, such as a request for one or more links to Web pages. In response to receiving the request, the method 300 identifies a network zone where the request originated and renders links (i.e., URIs) that are appropriate for the network zone. With continuing reference to FIGS. 1-2 and the accompanying descriptions, an exemplary link translation method 300 illustrated in FIG. 3 will now be described.

The link translation method 300 begins at block 302 where input is obtained from a system administrator. As described previously, resources may be published to more than one network and accessed with different URIs, depending on the network zone where a request originated. However, only the base URI that represents the protocol and the host computer varies between different network zones. Conversely, the path segment of a URI is constant regardless of the network zone where a set of resources is accessed. The present invention renders a URI by identifying a network-appropriate base URI and appending the known path to the base URI. At block 302, a system administrator associates a set of resources with one or more network zones where the set of resources may be accessed. For example, a system administrator may provide input that indicates a set of resources (including directories and files in a directory tree) is available on the Internet at "http://www.corp.com." Similarly, a system administrator may provide input indicating that the same set of resources is available on an Intranet at "http://corp." As described in further detail below, input obtained from a system administrator is used to dynamically render network-appropriate URIs. However, it should be well understood that input from a system administrator may occur on a single occasion and the mapping information may be updated at any time to reflect a change in network configuration. For example, when a system administrator publishes a new set of resources that is capable of being analyzed by the search engine 200, input may be obtained that associates the set of resources with the network zones where the resources may be accessed.

In an alternative embodiment of the present invention, the association between resources and one or more network zones where the resources may be accessed is performed automatically. For example, when a set of resources is published, the present invention may automatically determine that the resources are available on the Internet using the base URI "http://www.corp.com." Similarly, the present invention may automatically determine that the same resources are available on an Intranet using the base URI "http://corp." Automatic identification of the association between a set of resources and a URI that may be used to access the set of resources is performed by checking settings that are available when the set of resources is published.

At block 304, the link translation method 300 generates a link translation table that includes a unique host computer identifier for each computer, or cluster of computers, which hosts a set of resources in an organization. The speed of the present invention in rendering network-appropriate URIs is improved when a host computer identifier is used to identify a set of resources. As described in further detail below, a host computer identifier may also be used to create network-neutral URIs. At block 304, a link translation table is created that associates host computer identifiers with base URIs and the network zones where the base URIs are valid.

Figure 4:
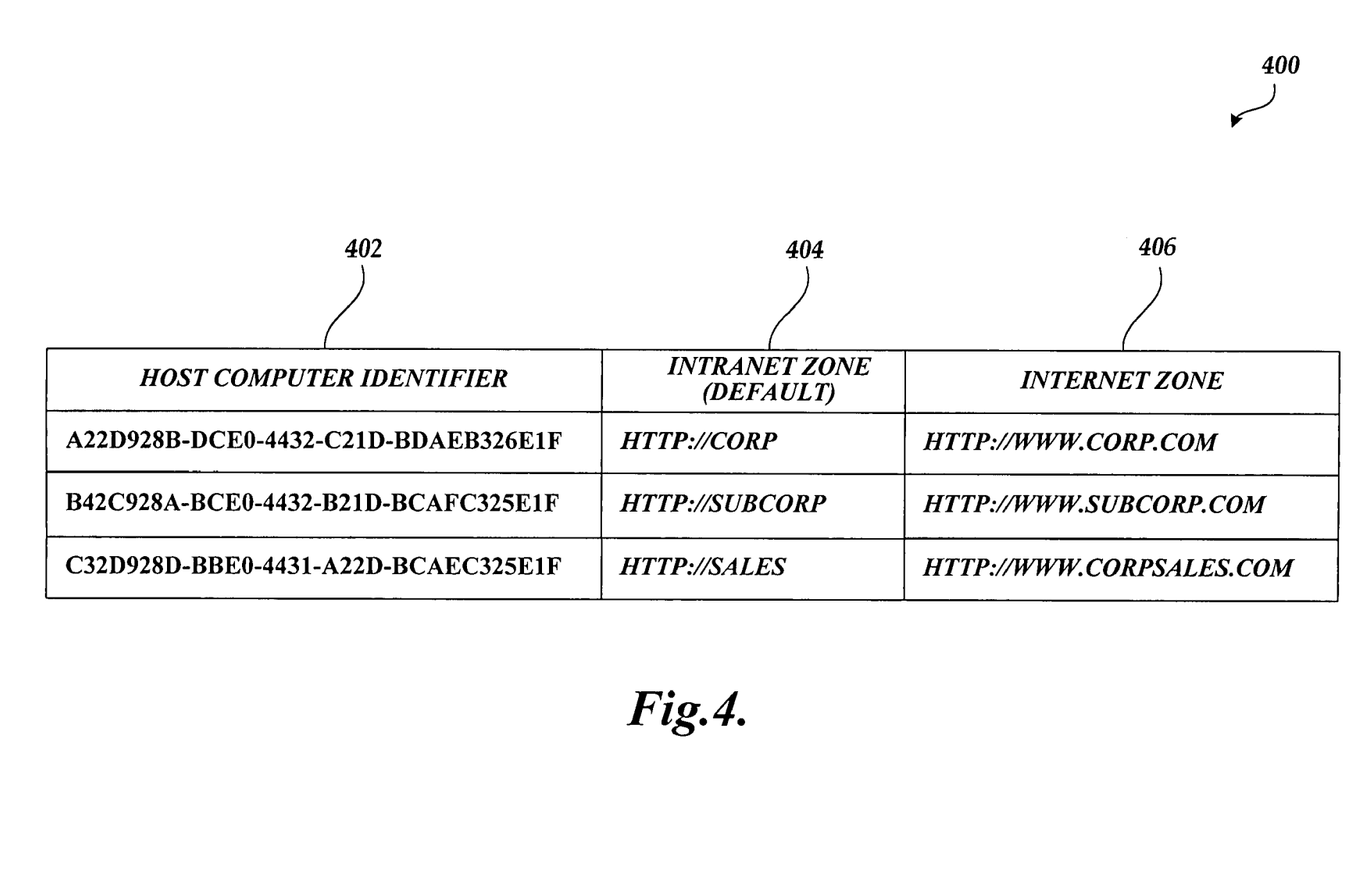
FIG. 4 is a pictorial depiction of a link translation table suitable to store data in conjunction with the method depicted in FIG. 3.

For illustrative purposes, a representative section of a link translation table 400 is depicted in FIG. 4. In this example, the link translation table 400 consists of three columns, each of which contains multiple entries. The columns are identified as HOST COMPUTER IDENTIFIER 402, INTRANET ZONE 404, and INTERNET ZONE 406. The column identified as HOST COMPUTER IDENTIFIER 402 contains a unique identifier for each computer or cluster of computers in an organization that hosts a set of network-accessible resources. The host computer identifier may be used to create a network-neutral identifier for a requested resource. As described in further detail below, if a user requests a resource with the URI "http://www.corp.com/product_manual.htm," the reference to the requested resource in this example may be stored by the present invention internally as "A22D928B-DCEO-4432-C21D-BDAEB326E1F/product_manual.htm." Although the link translation table 400 illustrates one table having specific attributes, those skilled in the art will appreciate that the present invention may operate with more or fewer than all of the listed attributes. For example, each network zone defined by a system administrator will be represented in a column of the link translation table 400.

Returning to FIG. 3, at block 306, the link translation method 300 remains idle and waits for a request, such as a request for links to one or more Web pages. As known to those skilled in the art and others, this type of request may be generated with the use of a commercially available Web browser, e-mail program, or other client-based software application capable of generating requests over a network. For example, a user may access an interface to the search engine 200 (FIG. 2) using a Web browser and generate a query that requests resources related to a search term. In response, the search engine 200 creates an index of the most relevant resources related to the search term. The link translation method 300, when implemented in conjunction with the search engine 200, renders network-appropriate URIs that are included in the index. While the description provided herein describes one example where a request is generated using a search engine 200, those skilled in the relevant art and others will appreciate that other contexts exist where URIs may be requested.

At block 307, the link translation method 300 identifies the network zone where the request received at block 306 originated using the input obtained at block 302. As described below with reference to FIG. 5, input obtained at block 302 is maintained in table data structures. At block 307, the network zone where the request originated is identified by performing a search of a table data structure.

Figure 5:
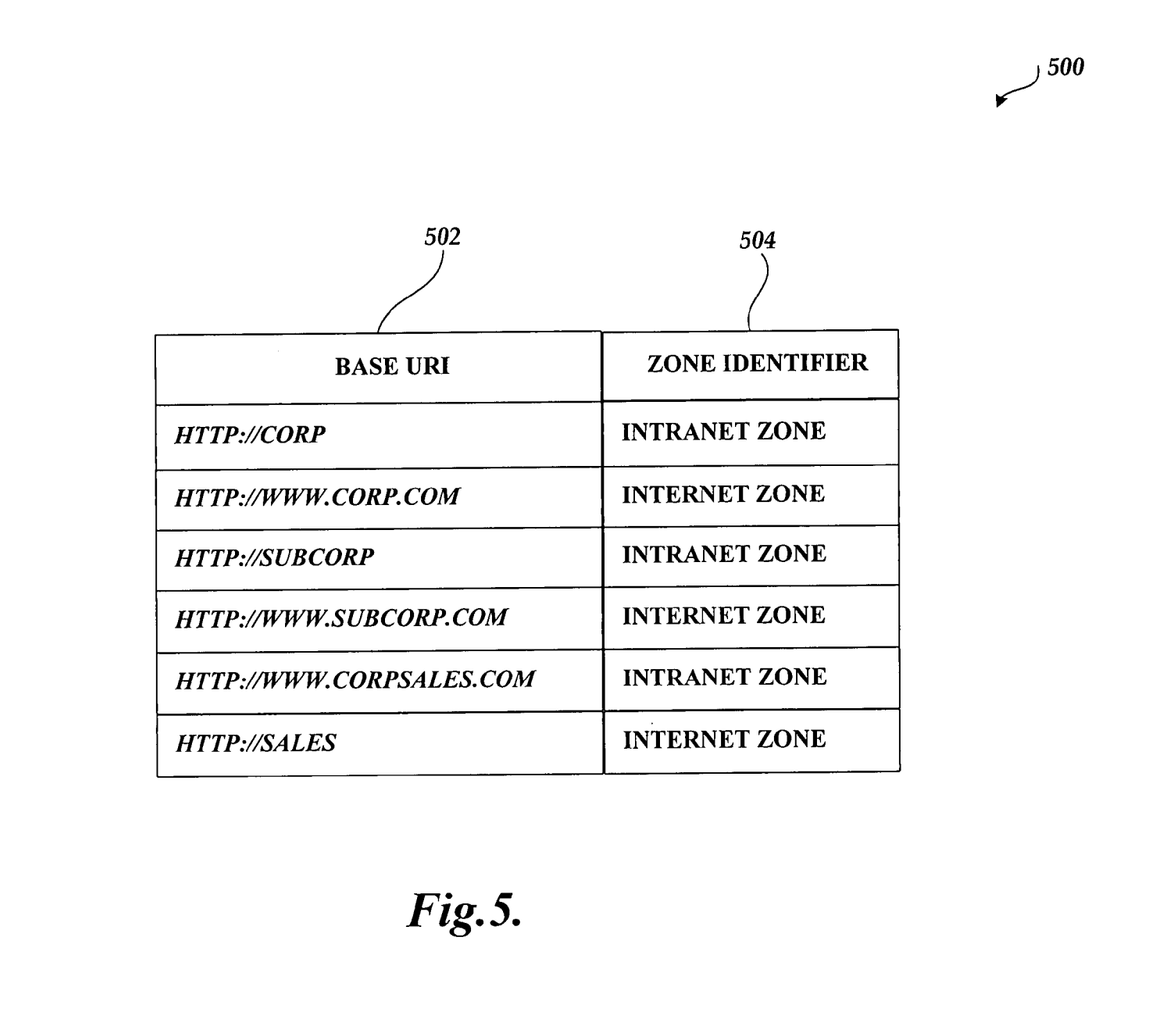
FIG. 5 is a pictorial depiction of a zone identification table suitable to store data in conjunction with the method illustrated in FIG. 3.

For illustrative purposes, a representative section of a zone identification table 500 is illustrated in FIG. 5. As illustrated, the zone identification table 500 consists of two columns, each of which contains multiple entries. The columns are identified as BASE URI 502 and ZONE IDENTIFIER 504. The column identified as BASE URI 502 contains valid base URIs that may be used to identify resources. The column identified as ZONE IDENTIFIER 504 consists of identifiers that represent network zones where an associated base URI is valid. For example, an identifier in the ZONE IDENTIFIER 504 column may represent the Internet, an Intranet, or any other network zone where a resource may be accessed. The network zone where a request originates is identified by searching the zone identification table 500 for the base URI that may be obtained in the request received at block 306. When the table entry of the base URI is identified, the entry in the same row in the ZONE IDENTIFIER 504 column identifies the network zone where the request originated. Since searching a table data structure for a string such as a base URI is generally known in the art, further description of these searching methods is not described in further detail here. Although this example illustrates one table having specific attributes, those skilled in the art will appreciate that the present invention may operate with more or fewer than all of the listed attributes.

In an alternative embodiment of the present invention, the network zone where a request originated is known because of the context in which a request is received. As mentioned above, the present invention may translate links contained in an e-mail message into a format that is appropriate for the network zone where the e-mail will be received. For example, existing computer systems allow users to receive automated e-mail messages when a specified event occurs. When these existing systems generate e-mail messages, the network zone where the e-mail message will be received is known and stored in memory. In this instance, identifying the network zone at block 314 involves recalling data that is stored in memory.

At block 308, the link translation method 300 selects a URI referenced in the request received at block 306. As described previously, the request received at block 306 may require a response that contains URIs that identify one or more resources. For each referenced resource, a network-appropriate URI is rendered by the link translation method 300.

At decision block 310, the link translation method 300 determines whether the resource referenced by the selected URI may be referenced using a relative URI. As known to those skilled in the art and others, some resources may be referenced using a relative URI that is a compact representation of a URI relative to a base. As described above, URIs may be used to direct users to specific resources. In instances where a base URI is well defined and known, a link may inherit a context for identifying a resource. For example, the URI "/sales/index.htm" is a relative URI that identifies a resource and may be read as follows—There is a resource with the same base URI as the current resource that is accessible using the path "/sales/index.htm."

In some instances, relative URIs are not capable of referencing a resource. For example, a resource with a different base URI than the current resource may not be identified with a relative URI. Stated differently, the location of a resource may not be expressed in terms of a current resource in all instances. Instead, some resources must be referenced with an absolute URI that contains all of the information needed to identify the resource. For example, a user may view a Web page that is hosted from a first server. As known to those skilled and the art and others, the Web page may contain links to resources hosted on the first server or links to resources hosted on remote servers that are identified using a different base URI than the current Web page. In this instance, links to resources hosted on the first server may identify resources with a relative URI. However, resources hosted on the remote server may not be identified using a relative URI.

At block 310, the method 300 analyzes the URI selected at block 308 to determine if the resource referenced by the URI may be identified using a relative URI. If the identity of the referenced resource cannot be expressed in terms of the current resource (i.e., the current and referenced resource do not have the same base URI), the link translation method 300 determines that the resource may only be referenced using an absolute URI and proceeds to block 314 described below. Conversely, if the resource may be referenced in terms of the current resource, the link translation method 300 determines that a relative URI may be used to reference the resource and proceeds to block 312.

At block 312, a relative URI that identifies the referenced resource is rendered. Since existing systems are able to render a relative URI, additional description of these systems will not be described in further detail here. After the relative URI is rendered, the link translation method 300 proceeds to block 318, described in further detail below.

At block 314, the link translation method 300 associates a network-neutral identifier with the resource referenced by the selected URI. The network-neutral identifier is a unique value that identifies the computer or cluster of computers that hosts the referenced resource. The network-neutral identifier may be combined with the path of the resource in order to generate a unique identifier for the resource. For example, if the selected URI initially references a resource using the URI "http://corp/product_manual.htm," when the network-neutral identifier and path are combined, the resource may be identified using the unique identifier "A22D928B-DCE0-4432-C21D-BDAEB326E1F/product_manual.htm." In one embodiment of the present invention, the identity of the computer that hosts the resource is obtained by performing a search of the link translation table 400. As illustrated in FIG. 4, the link translation table 400 associates host computer identifiers with the different base URIs used to identify resources. In an exemplary embodiment of the present invention, the base URI used to reference the resource (which may be obtained in the request received at block 306) is used as a hash key to identify the host computer. As known to those skilled in the art and others, performing a search of a table using a hash key is fast when compared to other types of searches. However, searches that do not use a hash key may be used to identify the host computer without departing from the scope of the present invention.

At block 316, the link translation method 300 generates a network-appropriate URI to identify the resource referenced by the selected URI. The link translation method 300 may identify a network-appropriate URI in one of a number of different ways. In one embodiment, the base portion of the network-appropriate URI is identified by performing a search of a table such as the link translation table 400 illustrated in FIG. 4. As described above, the link translation table 400 associates a host computer identifier with a zone identifier and network-appropriate base URI. At block 316 the network-appropriate base URI is identified by searching the link translation table 400 using the host computer identifier (identified at block 316) to identify the correct column and the network zone (identified at block 314) to identify the correct row. Then the network-appropriate base URI is concatenated with the path of the resource. While the exemplary link translation method 300 illustrated in FIG. 3 describes a process where network-appropriate base URIs are identified by searching the link translation table 400, which does not include the path of a resource, other embodiments of the present invention may include path information in the link translation table 400.

At decision block 318, the link translation method 300 determines if any additional URIs will be selected. As described previously, the request received at block 306 may require the link translation method 300 to translate one or more URIs into a network-appropriate format. If additional URIs do not need to be selected, the link translation method 300 proceeds to block 320 discussed below. Conversely, if additional links do need to be selected, the method 300 proceeds back to block 308, and blocks 308 through 318 repeat until all of the URIs have been selected.

At block 320, links (i.e., URIs) responsive to the request made at block 306 are transmitted from the portal server 104 to the computer where the request originated. Transmission of the response may utilize any one of a number of communication protocols known in the art. In one exemplary embodiment of the present invention, links are transmitted on markup documents using the HTML protocol and displayed with the use of a commercially available Web browser, e-mail program, or other client-based software application.

At block 322, the link translation method 300 remains idle and waits for a request for a resource. In one exemplary embodiment of the present invention, links transmitted at block 320 may be activated by a user with a mouse or similar input mechanism. Activating a link generates a request for the resource associated with the link. However, as known to those skilled in the art and others, requests for resources may be generated in other ways, and the example provided herein should be construed as exemplary and not limiting.

At block 324, the resource associated with the link activated at block 322 is transmitted from the computer that hosts the resource, such as proxy server 104, to the computer where the request originated. In order to identify the requested resource, the network-appropriate URI is retrieved from memory. When the network-appropriate URI is known, existing systems are able to transmit the resource to the requesting computer. Then the link translation method proceeds to block 326, where it terminates.

Implementations of the present invention are not limited to the exemplary link translation method 300 shown in FIG. 3. Other methods may perform steps in a different order than shown in FIG. 3, or steps may be added or removed without departing from the scope of the present invention. In some embodiments, the network zone where a request will be received is known because of the context in which a request is received. For example, the network zone of a computer where an e-mail message will be received may be set by a user and stored as a user preference in a client-based e-mail program. In this instance, determining the network zone where a request originated using the zone identification table 500 (at block 314) may be eliminated.

Figure 6:
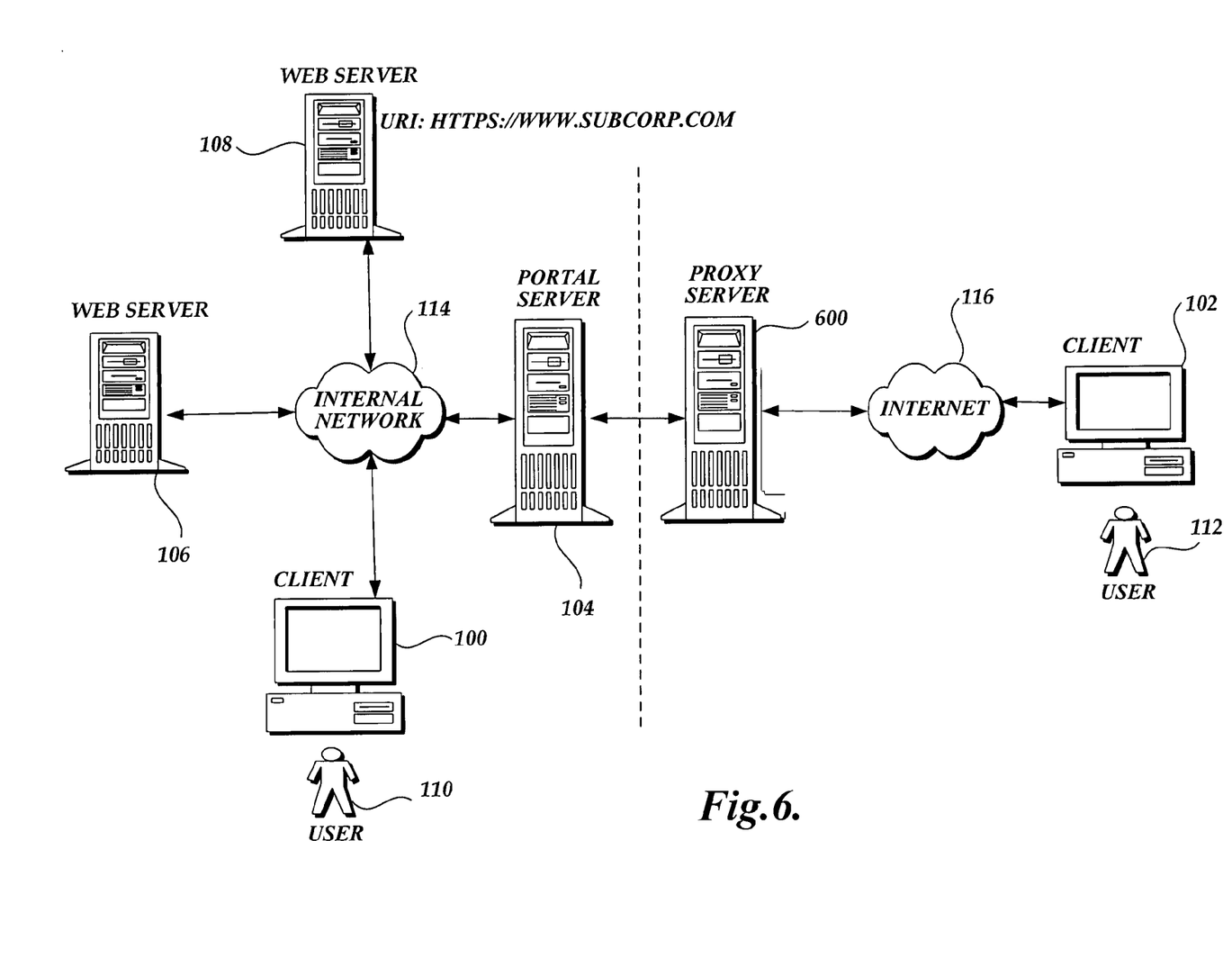
FIG. 6 is a pictorial depiction of another exemplary environment in which embodiments of the present invention may be implemented.

With reference now to FIG. 6, an exemplary application of the present invention will be illustrated. Increasingly, malicious computer users are intercepting network traffic that is transmitted over networks such as the Internet. For example, when a client computer requests a resource from a Web server, that resource is typically forwarded to the client computer using the unencrypted HTTP protocol. Integrity of the data is potentially at risk from known attacks—such as "man-in-the-middle" attacks. To ensure confidentiality and data integrity, network traffic transmitted between client and server computers is encrypted. One mechanism for encrypting network traffic is Secure Sockets Layer/Transport Layer Security (SSL/TLS), often referred to as SSL. When SSL is enabled, a user accesses a Web site by entering a URI or activating a link with an associated URI that begins with "HTTPS" rather than "HTTP."

Server computers may encrypt and decrypt their own network traffic. However, organizations typically design networks so that requests originating outside the organization are first processed by a proxy server, firewall, or other computer designed to prevent malicious computer attacks. FIG. 6 depicts a network environment in which network traffic from the Internet 116 is routed through a proxy server 600 prior to being forwarded to computers inside an organization. As illustrated, FIG. 6 contains the same components as depicted in FIG. 1, except the proxy server 600 enforces a security system for preventing attacks from malicious computer users. One method for enforcing a security system on the proxy server 600 is to decrypt incoming HTTPS requests at the proxy server 600 and then forward the requests using HTTP to servers capable of satisfying the requests, such as portal server 104. In this instance, encryption and decryption are the sole responsibility of the proxy server 600, which decreases the overhead to other servers in the organization. However, as known to those skilled in the art and others, server computers that are capable of satisfying requests respond to incoming HTTP requests with an HTTP response. In this instance, a server computer will render links with URIs in HTTP format that may be forwarded to the client computer where a request originated. Since the proxy server 600 may require a request for a resource to be encrypted using SSL, a user who activates a link with a URI in HTTP format could receive a "broken link." One application of the present invention is rendering URIs to support encryption and decryption of network traffic on a proxy server such as proxy server 600. As described above, proxy servers are configured to decrypt incoming requests and then forward the requests using the HTTP protocol to a server. The link translation method 300 performs a translation when a proxy server forwards a request using the HTTP protocol. For example, the link translation table 400 and the zone identification table 500 may include base URIs in HTTPS format. In this instance, when a request is received and table lookups occur, the link translation method 300 is aware that a request was generated from a network zone that requires HTTPS. Stated differently, when the table lookup procedures illustrated in FIG. 3 occur, the network-appropriate URI that is generated will identify the protocol as HTTPS.

A system that maintains geographically dispersed servers with mirrored resources provides yet another example of an application of the present invention. Some organizations maintain server computers with mirrored resources in order to better serve the needs of users and preserve limited bandwidth. In this instance, a server computer that hosts mirrored resources may satisfy requests from a specific geographic location. When a request, such as a request for a link to one or more Web pages, is received by a computer system that implements present invention, the request may be directed to a computer located close to the requesting computer. Similar to the embodiments of the present invention described above, when a request is received, table lookup procedures occur and a URI that identifies the computer that hosts the requested resource is generated.

While the preferred embodiment of the invention has been illustrated and described, it will be appreciated that various changes can be made therein without departing from the spirit and scope of the invention.

The invention claimed is:

1. In a computer networking environment where a resource is published to more than one network, a method of dynamically rendering a network-appropriate resource address for the resource in response to a request, the method comprising:

identifying base resource addresses that are used to reference the resource and network zones where the base resource addresses are valid;

determining one of the network zones where the request is originated;

identifying a computer that hosts the resource;

selecting a network-appropriate base resource address from the identified base resource addresses for the resource based on the determined one of the network zones;

determining whether the resource referenced by the network-appropriate base resource address is referenced using a relative resource address;

if the relative resource address is used to reference the resource, rendering the relative resource address that identifies the resource; and if the relative resource address is not used to reference the resource, associating a network-neutral identifier that identifies the computer hosting the resource with network-appropriate base resource address, and rendering the network-appropriate resource address;

wherein the network-appropriate resource address is generated by combining the network-neutral identifier and a path of the resource together.

2. The method of claim 1, further comprising combining the network-appropriate base resource address with the path of the resource on the computer that hosts the resource.

3. The method of claim 2, further comprising transmitting the requested resource to the computer that generated said request using the combined network-appropriate base resource address and path to identify the resource.

4. The method of claim 3, wherein transmitting the requested resource includes encrypting data included in the transmission.

5. The method of claim 1, wherein determining the network zone where said request originated includes:

identifying the base resource addresses used to reference the resource;

searching a data structure that associates the base addresses with the network zones where the base resource addresses are valid for the base resource addresses used to reference the resource; and determining that the network zone where said request originated is the network zone associated with the network-appropriate base resource address used to reference the resource in the data structure.

6. The method of claim 1, wherein the network zone where a request originated is a predetermined geographic region.

7. The method of claim 1, wherein computers that host resources are associated with network-appropriate base addresses in a table data structure.

8. The method of claim 1, wherein identifying the computer that hosts the resource includes:

searching a data structure that associates the base resource addresses with computers that host resources for the base resource addresses used to reference the resource; and determining that the computer that hosts the resource is the computer associated with the network-appropriate base resource address used to reference the resource in the data structure.

9. The method of claim 1, further comprising if a relative address is not used to identify the resource.

searching a data structure that associates computers that host resources with the base resource addresses; and determining that the network-appropriate base resource address is one of the base resource addresses associated with the computer that hosts the resource given in the network zone where said request originated.

10. The method of claim 9, wherein a host computer identifier is used as a hash key to search the data structure that associates host computers that host resources with network-appropriate base addresses.

11. The method of claim 1, wherein the network zone where said request originated is the Internet and said request is encrypted.

12. The method of claim 11, wherein said request is received and decrypted by a computer that enforces a security protocol and forwarded as a HyperText Transfer Protocol request to a computer that hosts the resource.

13. A computer-readable storage medium embedding computer-executable instructions that, when executed, carry out a method of dynamically rendering a network-appropriate resource address for a resource in response to a request, the method comprising:

identifying base resource addresses that are used to reference the resource and network zones where the base resource addresses are valid;

determining one of the network zones where the request is originated;

identifying a computer that hosts the resource;

selecting a network-appropriate base resource address from the identified base resource addresses for the resource based on the determined one of the network zones;

determining whether the resource referenced by the network-appropriate base resource address is referenced using a relative resource address;

if the relative resource address is used to reference the resource, rendering the relative resource address that identifies the resource; and if the relative resource address is not used to reference the resource, associating a network-neutral identifier that identifies the computer hosting the resource with network-appropriate base resource address, and rendering the network-appropriate resource address;

wherein the network-appropriate resource address is generated by combining the network-neutral identifier and a path of the resource together.

14. The computer-readable storage medium of claim 13, further comprising combining the network-appropriate base resource address with the path of the resource on the computer that hosts the resource.

15. The computer-readable storage medium of claim 14, further comprising transmitting the requested resource to the computer that generated said request using the combined network-appropriate base resource address and the path to identify the resource.

16. The computer-readable storage medium of claim 15, wherein transmitting the requested resource includes encrypting data included in the transmission.

17. The computer-readable storage medium of claim 13, wherein determining the network zone where said request originated includes:

identifying the base resource addresses used to reference the resource;

searching a data structure that associates the base addresses with the network zones where the base resource addresses are valid for the base resource addresses used to reference the resource; and determining that the network zone where said request originated is the network zone associated with the network-appropriate base resource address used to reference the resource in the data structure.

18. The computer-readable storage medium of claim 13, wherein the network zone where a request originated is a predetermined geographic region.

19. The computer-readable storage medium of claim 13, wherein computers that host resources are associated with network-appropriate base addresses in a table data structure.

20. The computer-readable storage medium of claim 13, wherein identifying the host computer that hosts the resource includes:
- searching a data structure that associates the base resource addresses with computers that host resources for the base resource addresses used to reference the resource; and
- determining that the computer that hosts the resource is the computer associated with the network-appropriate base resource address used to reference the resource in the data structure.

21. The computer-readable storage medium of claim 13, further comprising if the relative address is not used to identify the resource,
- searching a data structure that associates computers that host resources with the base resource addresses; and
- determining that the network-appropriate base resource address is one of the base resource addresses associated with the computer that hosts the resource given in the network zone where said request originated.

22. The computer-readable storage medium of claim 21, wherein a host computer identifier is used as a hash key to search the data structure that associates host computers that host resources with network-appropriate base addresses.

23. The computer-readable storage medium of claim 13, wherein the network zone where said request originated is the Internet and said request is encrypted.

24. The computer-readable storage medium of claim 23, wherein said request is received and decrypted by a computer that enforces a security protocol and forwarded as a Hyper-Text Transfer Protocol request to a computer that hosts the resource.

* * * * *